April 22, 1969        J. H. BLOMSTRAND        3,440,334
CONNECTOR WITH HELICALLY WOUND SPRING AND EXTERNAL MEANS
FOR RELEASING THE SPRING TO CAUSE GRIPPING OF WIRES
Filed Feb. 2, 1967
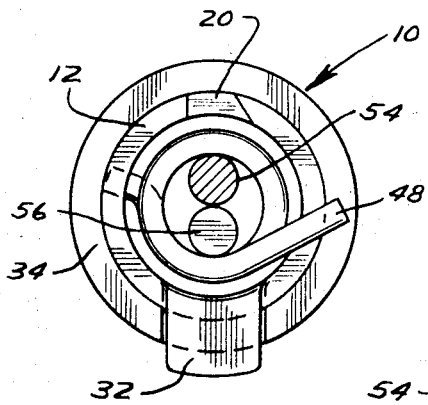
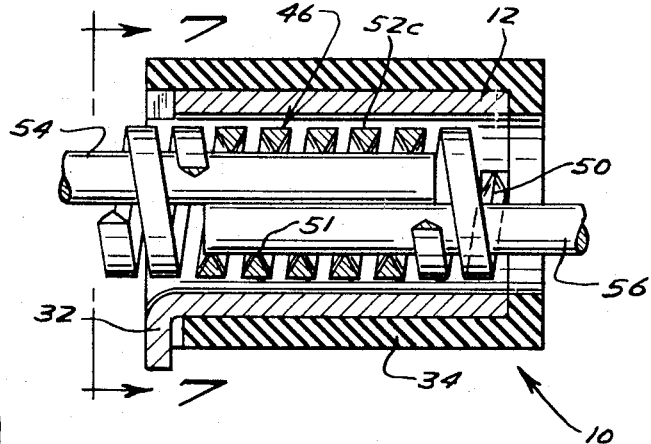
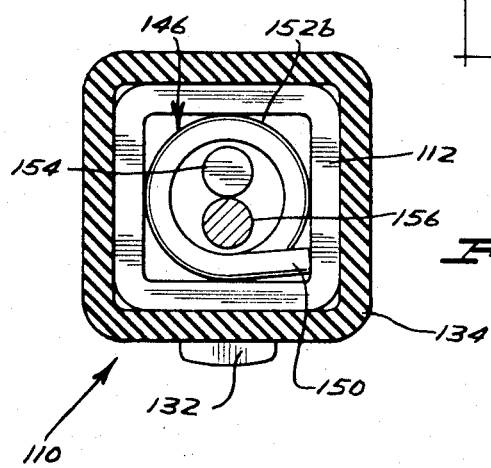
INVENTOR.
JOHN H. BLOMSTRAND

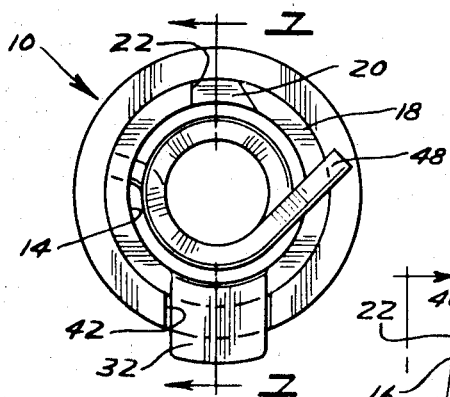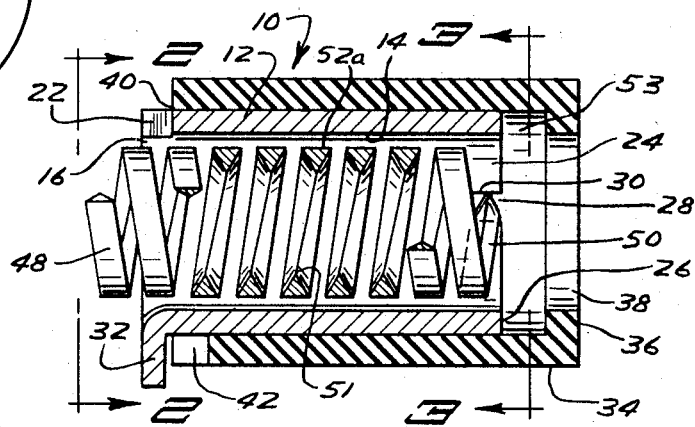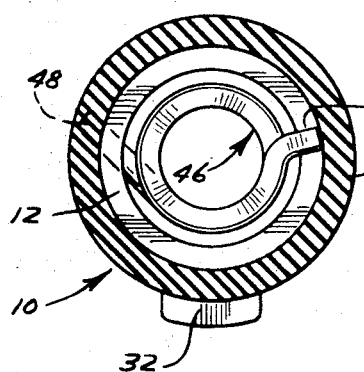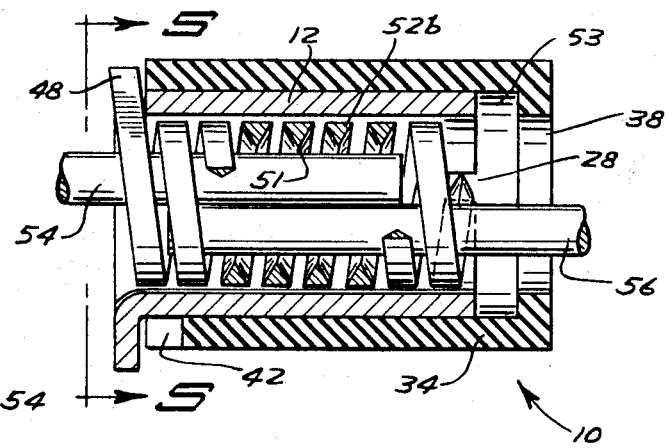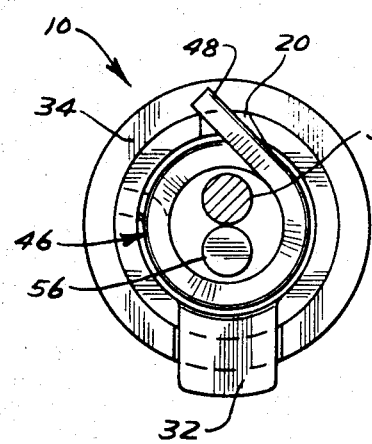

United States Patent Office 3,440,334
Patented Apr. 22, 1969

3,440,334
CONNECTOR WITH HELICALLY WOUND SPRING AND EXTERNAL MEANS FOR RELEASING THE SPRING TO CAUSE GRIPPING OF WIRES
John H. Blomstrand, 214 Hazel Drive,
Corona Del Mar, Calif. 92625
Filed Feb. 2, 1967, Ser. No. 613,515
Int. Cl. H02g 15/08
U.S. Cl. 174—87                             8 Claims

ABSTRACT OF THE DISCLOSURE

An elongated hollow shell is notched at opposite ends for the purpose of maintaining a coil spring in a torsionally cocked condition, one end of the spring being held in one notch and the other end of the spring in the other notch. When one spring end is disengaged from its notch by relative movement of an outer sleeve, the enlarged convolutions of the spring immediately contract against and thereby grip the wires that have been inserted into the spring, either or both ends thereof.

BACKGROUND OF THE INVENTION

*Field of the invention*

This invention relates generally to devices for securing the ends of a plurality of wires together without resort to soldering, welding or the like, and pertains more particularly to a connector where the gripping action is provided automatically without manual effort on the part of the user.

*Description of the prior art*

A number of devices, such as the wire connector depicted in my U.S. Patent No. 2,656,204, have been devised but these prior art devices require a manual twisting of the connector in order to effect the connection of the wires to be joined together. I do not in any way wish to disparage such devices for they have met with widespread commercial success, but the need for manual rotation requires a certain amount of personal effort on the part of the user. Even more important is that the speed with which wires can be connected with such prior art devices is relatively slow compared to my present device because the present connector can be sold or delivered in a cocked condition, thereby accelerating the connecting procedure. Also, this can be done without tools and can be done at a relatively low cost inasmuch as no critical metals need by employed. Furthermore, since the manual twisting required heretofore is obviated, the connector envisaged by the present invention can be quite small and compact.

SUMMARY OF THE INVENTION

Briefly stated, the invention comprises an inner shell that contains a coil spring which is torsionally cocked at the factory so as to enlarge at least certain of the convolutions. One end of the spring is anchored to one end of the shell, and the other end of the spring is releasably engaged with a notch so that when that particular end of the spring is forced outwardly from the notch by means of an external or outer sleeve, the expanded or enlarged convolutions quickly contract so as to grip a pair of wires in which one wire has been inserted from one end of the connector and the other wire from the opposite end, although the user has the choice of inserting both wires from either end of the connector.

BRIEF DESCRIPTION OF THE DRAWINGS

FIGURE 1 is a longitudinal sectional view of one form of my connector, the view being taken longitudinally through the center of the connector in the direction of line 1—1 of FIGURE 2 and showing the coil spring in its normal or uncocked condition;

FIGURE 2 is an end view of the connector shown in FIGURE 1 taken in the direction of line 2—2 thereof;

FIGURE 3 is a sectional view along the line 3—3 of FIGURE 1;

FIGURE 4 is a longitudinal sectional view corresponding to FIGURE 1 but with the spring in its torsionally wound or cocked condition which allows the insertion of a plurality of wires;

FIGURE 5 is an end view taken in the direction of line 5—5 of FIGURE 4;

FIGURE 6 is still an additional sectional view corresponding to FIGURES 1 and 4, but illustrating the coil spring after it has been released by relative movement of the inner and outer members, the coil spring thereby contracting so as to securely grip the wires that have been inserted as pictured in FIGURE 4;

FIGURE 7 is an end view taken in the direction of line 7—7 of FIGURE 6; and

FIGURE 8 is a modified version of the invention, the view being taken in the direction of line 3—3 of FIGURE 1 but of the different embodiment when in the cocked condition corresponding to that of FIGURE 4.

DESCRIPTION OF THE PREFERRED EMBODIMENTS

Reference will first be made to the embodiment depicted in FIGURES 1–7 and attention is initially drawn to FIGURES 1 and 2. The connector has been indicated in its entirety by the reference numeral 10. The connector 10 includes a cylindrical metal shell 12 having a hollow bore 14 extending completely therethrough so as to provide an open end 16 at the left and also a planar bearing surface 18 at this particular end. While the bearing surface 18 is planar, generally speaking, there is formed in this surface an arcuate notch 20 providing a stop or abutment at 22. The other end, this being the right end, has been labeled 24 and it will be discerned that this end of the shell 12 is also open and while not necessary, there is a planar surface 26 provided which has an arcuate notch 28 therein, there being a stop or abutment 30. The shell 12 is further formed with a downturned tab or ear 32 for a purpose hereinafter explained.

The metal shell 12 is telescopically received in an outer dielectric sleeve 34 having an inturned circular flange 36 at the right, thereby leaving an opening 38. The outer sleeve 34 is open at its other end also and this opening has been given the reference numeral 40. For the accommodation of the downturned tab or ear 32, there is a notch 42 into which the tab or ear 32 can longitudinally move.

Within the metal shell 12 is a coil spring 46 having a first end 48 and a second end 50, the spring 46 further being comprised of intermediate convolutions 52 that are formed with a suitable cross-section (triangular as seen in FIGURES 1, 4 and 6) to provide a sharp biting edge 51. FIGURE 1, it should be pointed out, shows the coil springs 46 in its natural or normal condition. Consequently, as will soon be readily understood, the convolutions 52a indicate a fairly small size for the convolutions. However, when the first end 48 is turned or rotated in a clockwise direction to approximately ¾ of a turn, the convolutions 52 become enlarged as can be seen in FIGURE 4. To distinguish the convolutions in FIGURE 4 from those appearing in FIGURE 1, the reference character 52b has been selected. It should be noted that when the first end 48 is turned through the previously-mentioned angle, this being approximately 270°, the end of the spring labeled 48 can be twisted through this angle so that it can be releasably retained in the notch 20 as can be appreciated from FIGURE 5. The particular angle is not critical to the practicing of the invention, for other angles can be selected. It will be recognized that the second spring end 50 is fixedly retained or anchored in the notch 28 so that when the spring end 48 is rotated as hereinbefore described, the coil spring 46 becomes torsionally wound or cocked.

FIGURES 1 and 4 illustrate that there is a space 53 existing between the inturned flange 36 on the dielectric sleeve 34 and the planar surface 26 of the metal shell 12. This allows the members 12 and 34 to be moved longitudinally with respect to each other, the two members being slidably fitted together by reason of the telescopic mating of these two members. Consequently, when it is desired to release the coil spring 46 from its cocked or charged condition, the user need only move the shell 12 and the sleeve 34 relative to each other so as to cause the sleeve 34 to engage the first spring end 48 with sufficient force so as to dislodge this spring end from the notch 20. This is easily accomplished by simply grasping the tab 32 and the outside of the flange 36 between one's fingers. This releases the coil spring and the first end 48 quickly attempts to return to its normal position as illustrated in FIGURE 2. However, it is prevented from doing this completely by reason of the wires to be gripped and held together.

With this information in mind, attention is once again directed to FIGURE 4 wherein a pair of wire ends 54 and 56 have been illustrated. It will be seen that the wire end 54 has been inserted into the connector 10 from the left and the wire end 56 from the right. This is an important advantage with respect to the present invention, for it sometimes occurs that two wires are to be connected together in a splice-like manner and the present invention allows this to be easily achieved.

Hence, when the tab 32 is actuated so as to move the shell 12 with respect to the sleeve 34, the disengagement previously mentioned occurs and the convolutions 52 immediately contract against the wire ends as illustrated in FIGURE 6 and FIGURE 7. To distinguish the convolutions in this state from the convolutions 52a and 52b, the suffix c has been added and therefore the convolutions in their contracted condition have been designated by the reference character 52c.

At this time, it should be readily appreciated that the biting edge 51, provided by the triangular configuration of the convolutions 52, makes it such that the wire ends 54, 56 are very effectively gripped.

Differing from the embodiment 10 is the embodiment 110 in FIGURE 8. Rather than having the metal shell of circular cross-section, the shell 112 here shown has been illustrated as non-circular, more specifically of square cross-section. The shell 112 is not sectionized, however, in this view because the view is taken in the direction of line 3—3 of FIGURE 1 but with the connector in its cocked condition which makes the view more closely resembling what would be seen if the sectioning were taken in a similar plane in FIGURE 4. The outer sleeve 134 is in section because of the plane in which the view is taken. The sleeve 134 is of square cross-section as can readily be appreciated. Consequently, the spring end 150 of the spring 146 can be fixedly anchored without resort to any notch at this end. More specifically, the equivalent of the notch 28 is not necessary in this embodiment, for as can be easily understood, there is no way for the spring end 150 to turn when the opposite end is twisted. The opposite end is not visible in FIGURE 8, but it will be appreciated that it corresponds precisely to the first spring end identified by the reference numeral 48 in embodiment 10.

Actually, for the sake of completeness, while the view has been considered to be in the direction of line 3—3 of FIGURE 1 but of the modified connector, the condition of the convolutions 152 corresponds to that of FIGURE 4 and has been given the reference numeral 152b. In other words, the condition of the connector 110 illustrates this connector in its cocked condition and the wires 154 and 156 have been inserted just as the wires 54 and 56 have been inserted in FIGURES 4 and 5.

Relative movement of the members 112 and 134 through the agency of the tab 132 results in the triggering or release of the coil spring 146 from its cocked or charged condition so that the spring then grips the inserted wires in the same manner as in FIGURES 6 and 7.

From what has been presented herein, it will be evident that the coil spring 46 or 146, as the case may be, can be torsionally wound at the factory and retained in this condition until the connector is used. An extremely large amount of gripping force can be applied to the wires in this instance and can be quickly accomplished inasmuch as the user is not troubled with any twisting of the connector as heretofore required in the type of prior art device mentioned earlier herein. The present invention has the distinct advantage in giving the user a choice as to whether the wire ends are inserted from opposite ends of the connector or whether both wire ends are inserted as a pair from the same end.

While the foregoing choices are afforded the user, he is also provided with a connector in which the spring is pre-loaded so that all he need do is to trigger its release via the telescopic movement of the members 12 and 34, or 112 and 134. The amount of gripping action can be determined by various parameters and these parameters are not left to the selection of the user. Consequently, the proper amount of gripping or holding action can be more accurately controlled than with the prior art type of connector that has been herein alluded to, and, of course, the gripping action is achieved virtually instantaneously with the type of connector herein described.

What is claimed is:

1. A connector for gripping and holding a plurality of wires comprising a coil spring having first and second longitudinally spaced ends and a series of intermediate resilient convolutions, said spring being disposed in an elongated shell having a length corresponding substantially to the length of said coil spring, said shell being formed with an abutment at one end releasably retaining said first end in an angularly displaced position with respect to said second end torsionally cocking said spring and transversely enlarging at least some of said convolutions for the reception of the plurality of wires to be gripped, said first spring end extending outwardly beyond said abutment and said shell, and a sleeve encircling said shell and longitudinally movable therealong for engaging said first spring end for effecting the release of said first end, whereby when said first end is released by said sleeve said enlarged convolutions contract to grip and hold said wires.

2. A connector for gripping and holding a plurality of wires comprising a sleeve, a shell telescopically received in said sleeve, said sleeve and shell being longitudinally movable relative to each other, said sleeve and shell being open at one end to allow insertion of said wires, a coil spring contained in said shell having first and second longitudinally spaced ends and a series of intermediate resilient convolutions, means anchoring said second spring end with respect to the other end of said shell, said shell having a notch at one end releasably retaining said first spring end in an angularly displaced position with respect to said second spring end torsionally cocking said spring and transversely enlarging at least some of the convolutions for the reception of the plurality of wires to be gripped, said first spring end projecting transversely through said notch and beyond said shell so as to be engageable by said sleeve to effect the release of said first spring end when said sleeve is moved thereagainst, whereby said enlarged convolutions then contract to grip and hold said wires.

3. A connector in accordance with claim 2 in which said sleeve is of dielectric material and said shell is metallic.

4. A connector in accordance with claim 2 in which anchoring means includes an additional notch in said shell, said second spring end being received in said additional notch.

5. A connector in accordance with claim 2 in which said anchoring means includes angularly disposed wall portions, said shell and sleeve being of non-circular cross-section to form said wall portions and said second spring end engaging one of said wall portions.

6. A connector in accordance with claim 2 in which said sleeve and shell are also open at their other ends so that one wire may be inserted to allow one wire to be inserted therethrough and another wire inserted through said one end of said shell.

7. A connector in accordance with claim 6 including an outturned projection on said shell at said one end.

8. A connector in accordance with claim 7 including an inturned flange at said other end of said sleeve.

References Cited

UNITED STATES PATENTS

| | | |
|---|---|---|
| 704,869 | 7/1902 | Fischer et al. _____ 287—104 |
| 1,630,958 | 5/1927 | Mauch. |
| 2,604,135 | 7/1952 | Ryberg. |
| 3,243,211 | 3/1966 | Wetmore _____ 174—87 XR |

FOREIGN PATENTS

| | | |
|---|---|---|
| 380,393 | 9/1932 | Great Britain. |

DARRELL L. CLAY, *Primary Examiner.*

U.S. Cl. X.R.

85—32; 151—14; 287—75